(12) United States Patent
Hall et al.

(10) Patent No.: US 9,057,595 B2
(45) Date of Patent: Jun. 16, 2015

(54) COMBINATION OF MIRROR IMAGES TO IMPROVE SIGNAL QUALITY FOR CONTACT LENSES

(71) Applicant: Novartis AG, Basel (CH)

(72) Inventors: William Jordan Hall, Charlotte, NC (US); Yeming Gu, Suwanee, GA (US)

(73) Assignee: Novartis AG (CH)

( * ) Notice: Subject to any disclaimer, the term of this patent is extended or adjusted under 35 U.S.C. 154(b) by 21 days.

(21) Appl. No.: 13/689,316

(22) Filed: Nov. 29, 2012

(65) Prior Publication Data

US 2013/0135625 A1 May 30, 2013

Related U.S. Application Data

(60) Provisional application No. 61/565,297, filed on Nov. 30, 2011.

(51) Int. Cl.
*G01B 9/02* (2006.01)

(52) U.S. Cl.
CPC ........ *G01B 9/02091* (2013.01); *G01B 9/02028* (2013.01); *G01B 9/02064* (2013.01); *G01B 9/02078* (2013.01)

(58) Field of Classification Search
CPC ........... G01B 9/02028; G01B 9/02064; G01B 9/02078; G01B 9/02084; G01B 9/02091
USPC ................................................ 356/479, 497
See application file for complete search history.

(56) References Cited

U.S. PATENT DOCUMENTS

| | | | |
|---|---|---|---|
| 2,823,041 A | 2/1958 | Retz |
| 3,656,832 A | 4/1972 | Judin |
| 3,692,414 A | 9/1972 | Hosterman |
| 3,804,523 A | 4/1974 | McCormack |
| 3,822,096 A | 7/1974 | Wilms |
| 3,874,798 A | 4/1975 | Antonsson |
| 3,901,606 A | 8/1975 | Watanabe |
| 3,917,391 A | 11/1975 | Padula |
| 3,947,129 A | 3/1976 | Wiklund |
| 3,978,620 A | 9/1976 | Feneberg |
| 4,072,428 A | 2/1978 | Moss |
| 4,103,915 A | 8/1978 | Zdanovsky |
| 4,210,038 A | 7/1980 | Hill |
| 4,232,966 A | 11/1980 | Schpak |
| 4,289,400 A | 9/1981 | Kubota |

(Continued)

FOREIGN PATENT DOCUMENTS

| | | |
|---|---|---|
| JP | 56160631 A2 | 12/1981 |
| JP | 04305144 | 10/1992 |
| WO | 2009058850 A1 | 5/2009 |

OTHER PUBLICATIONS

Authors: Todd Blalock, Steve Heveron-Smith Title: Practical applications in film and optics measurements for dual light source interferometry Published: Copyright 2004 Society of Photo-Optical Instrumentation Engineers, 7 pages.

(Continued)

*Primary Examiner* — Michael A Lyons
(74) *Attorney, Agent, or Firm* — Robert A. Ambrose

(57) ABSTRACT

A method and system to provide for increased signal intensity and improved signal quality in Fourier-domain optical coherence tomography (FDOCT) by capturing the real and virtual images of an object being imaged by FDOCT in sequence or consecutively.

8 Claims, 3 Drawing Sheets

(56) References Cited

U.S. PATENT DOCUMENTS

| | | |
|---|---|---|
| 4,387,994 A | 6/1983 | Balasubramanian |
| 4,417,147 A | 11/1983 | Faville |
| 4,469,646 A | 9/1984 | Rawlings |
| 4,576,482 A | 3/1986 | Pryor |
| 4,623,249 A | 11/1986 | Grant |
| 4,647,261 A | 3/1987 | Schaffner |
| 4,665,624 A | 5/1987 | Wodis |
| 4,684,246 A | 8/1987 | Downing |
| 4,745,295 A | 5/1988 | Seno |
| 4,815,844 A | 3/1989 | Schmalfuss |
| 4,815,846 A | 3/1989 | Wodis |
| 4,939,983 A | 7/1990 | Lipinski |
| 5,240,359 A | 8/1993 | Backhouse |
| 5,291,273 A | 3/1994 | Gelbart |
| 5,443,152 A | 8/1995 | Davis |
| 5,467,192 A | 11/1995 | Manning |
| 5,500,732 A | 3/1996 | Ebel |
| 5,517,602 A | 5/1996 | Natarajan |
| 5,559,848 A | 9/1996 | Collins |
| 5,574,554 A | 11/1996 | Su |
| 5,596,409 A | 1/1997 | Marcus |
| 5,604,583 A | 2/1997 | Byron |
| 5,673,110 A | 9/1997 | Erickson |
| 5,708,501 A | 1/1998 | Ikezawa |
| 5,760,889 A | 6/1998 | Manning |
| 5,880,171 A | 3/1999 | Lim |
| 5,930,734 A | 7/1999 | Hofmann |
| 6,034,772 A | 3/2000 | Marcus |
| 6,047,082 A | 4/2000 | Rhody |
| 6,072,569 A | 6/2000 | Bowen |
| 6,072,570 A | 6/2000 | Chipman |
| 6,113,817 A | 9/2000 | Herbrechtsmeier |
| 6,134,342 A | 10/2000 | Doke |
| 6,154,274 A | 11/2000 | Davis |
| 6,259,518 B1 | 7/2001 | Russell |
| 6,587,265 B1 | 7/2003 | Endoh |
| 6,623,669 B1 | 9/2003 | Slack |
| 6,690,473 B1 | 2/2004 | Stanke |
| 6,700,671 B2 | 3/2004 | Akishiba |
| 6,750,958 B1 | 6/2004 | Fantone |
| 6,757,420 B2 | 6/2004 | Krahn |
| 6,765,661 B2 | 7/2004 | Biel |
| 6,788,399 B2 | 9/2004 | Frumusa |
| 6,829,054 B2 | 12/2004 | Stanke |
| 6,917,665 B2 | 7/2005 | Nakanish |
| 6,937,328 B2 | 8/2005 | Fukuma |
| 6,944,261 B2 | 9/2005 | Adachi |
| 6,957,095 B2 | 10/2005 | Matsui |
| 6,987,827 B2 | 1/2006 | Tsukagoshi |
| 6,990,168 B2 | 1/2006 | Tsukagoshi |
| 6,990,170 B2 | 1/2006 | Sugihara |
| 6,990,175 B2 | 1/2006 | Nakashima |
| 7,042,556 B1 | 5/2006 | Sun |
| 7,125,175 B2 | 10/2006 | Hill |
| 7,198,777 B2 | 4/2007 | Boppart |
| 7,215,736 B1 | 5/2007 | Wang |
| 2002/0085208 A1 | 7/2002 | Hauger |
| 2004/0189981 A1 | 9/2004 | Ross, III |
| 2005/0179154 A1 | 8/2005 | Young |
| 2006/0109484 A1 | 5/2006 | Akamatsu |
| 2006/0132761 A1 | 6/2006 | Hall |
| 2006/0146316 A1 | 7/2006 | Hong |
| 2006/0176491 A1 | 8/2006 | Hall |
| 2006/0285635 A1 | 12/2006 | Boppart |
| 2007/0195311 A1 | 8/2007 | Morgan |
| 2007/0247639 A1 | 10/2007 | Amstel |
| 2007/0286468 A1 | 12/2007 | Joshi |
| 2008/0030876 A1 | 2/2008 | Kataoka |
| 2012/0026462 A1* | 2/2012 | Uhlhorn et al. ............ 351/206 |

OTHER PUBLICATIONS

Authors: Anant Agrawal, Stanley Huang, Joshua Pfefer, Min-Ho Lee, Rebekah Drezek Title: Quantitative Evaluation of Nanoshells as a Contrast Agent for Optical Coherence Tomography Published: 2005 Optical Society of America, 2005 Conference on Lasers & Electro-Optics. pp. 2049-2051.

Authors: Chenyang Xu, Jian Ye, Daniel L. Marks, Stephen A. Boppart Title: Near-infrared Dyes as Contrast-enhancing Agents for Spectroscopic Optical Coherence Tomography Published: 2004 Optical Society of America, Jul. 15, 2004, vol. 29, No. 14, Optics Letters, pp. 1647-1649.

Author: Stephen A. Boppart Title: Advances in Contrast Enhancement for Optical Coherence Tomography Published: Engineering in Medicine and Biology Society, 2006, 28th IEEE EMBS Annual International Conference, New York City, NY, Aug. 30-Sep. 3, 2006, pp. 121-124.

www.skyscan.be; SkyScan1172 high-resolution micro-CT; (date unknown): 3 pgs.

www.skyscan.be; SkyScan1173 high energy micro-CT; (date unknown): 3 pgs.

www.skyscan.be; SkyScan1174 compact micro-CT; (date unknown): 3 pgs.

www.skyscan.be; SkyScan1076 in-vivo micro-CT; (date unknown): 2 pgs.

www.skyscan.be; SkyScan1178 high-throughput micro-CT; (date unknown): 2 pgs.

Authors: Chuanmao Fan and Gang Yao Article: Single camera spectral domain polarization-sensitive optical coherence tomography using offset B-scan modulation Published: Optics Express 2010, Mar. 29, 2010; vol. 18; No. 7, pp. 7281-7287.

* cited by examiner

COMBINATION OF MIRROR IMAGES TO IMPROVE SIGNAL QUALITY FOR CONTACT LENSES

This application claims the benefit under 35 USC §119 (e) of U.S. provisional application Ser. No. 61/565,297 filed Nov. 30, 2011, incorporated herein by reference in its entirety.

FIELD

The present invention relates to a method and system for improving signal quality in contact lens imaging.

BACKGROUND

Optical Coherence Tomography (OCT) is a non-contact imaging system and method which may be used for surface and thickness profiling of optical structures and assemblies, for example, contact lenses or contact lens subassemblies. Using special Fourier-domain OCT (FDOCT) with an ultra-long scan range, the entire cross-section of an object, for example a contact lens submerged in saline, can be imaged in a single sweep (B-scan).

The current method of processing the raw image data from a B-scan requires the conversion of frequency to depth using fast Fourier transform (FFT). This usually results in a processed image containing two mirror images—a real image and a virtual image, depending on the pathlength of an internal reference beam. The pathlength of the reference beam may be adjusted continuously, and there are two particular positions such that one position results in a real image of the full cross-section while the other position results in a mirrored virtual image of the full cross-section. The virtual image is normally referred to as the complex conjugate artifact of FDOCT. In terms of signal value vs. pathlength, the virtual image appears as a mirror image of the real image, with the mirror point at zero pathlength.

A characteristic of the above image capture system is the systemic (monotonic) change in signal intensity with scan depth. For the B-scan cross-section images, the pathlength of the reference beam translates into scan depth (in terms of optical path length of the scanning beam). For example, for a given beam focus position and for a given medium absorption level, the intrinsic signal degradation with depth is the dominating factor. If an object such as a contact lens is placed in a cuvette and is scanned from the top of the lens, the apex of the lens will appear near the top (depth=0) of a B-scan in the real image, resulting in a higher signal intensity at the apex. Conversely, the edge of the lens will appear near the top of the B-scan in the virtual image, resulting in a higher signal intensity at the edges, rather than the apex. As a result, when the real and virtual images are viewed together, the overall image quality is reduced, and neither individual image contains the optimal signal level for the entire sample.

It is therefore desirable to provide for a method and system for capturing the real and virtual images of FDOCT in sequence or consecutively to provide for increased signal intensity at various portions of the object being imaged, for example at the apex and edge of an object such as a contact lens.

SUMMARY

The present invention advantageously provides a method and system for improving the signal quality in a FDOCT image of a contact lens or other optical structures by collecting the real and virtual images in sequence.

In an embodiment, a system is provided for acquiring the real and virtual images of an object. The system includes a Fourier-domain optical coherence tomography (FDOCT) imaging system having a reference beam, the reference beam having a pathway and defining two reference arm lengths; and also includes at least one of an optical chopper, linear stage, and fiber-optic switch disposed along a portion of the reference beam and modifying the pathlength of the reference beam.

Also provided herein is a method for acquiring the real and virtual images of an object. In embodiments, the method includes the steps of providing a Fourier-domain optical coherence tomography (FDOCT) imaging system; generating a reference beam having two different pathlengths; modifying the pathlength of the reference beam; and acquiring a real image and virtual image of the object consecutively.

In another embodiment, the method for acquiring the real and virtual images of an object includes the steps of providing a Fourier-domain optical coherence tomography (FDOCT) imaging system; generating a reference beam having two different pathlengths, wherein the pathlengths are pre-defined and calibrated; acquiring a real image and virtual images of the object consecutively, wherein the two images are superimposed or averaged to achieve more uniform signal level across the depth range.

In embodiments using an optical chopper, the optical chopper is disposed along a portion of the reference beam pathway, and can include a movable refractive medium that is capable of movement into and out of the optical coherence tomography reference beam pathway. The movable refractive medium may be, for example, a glass lens.

In other embodiments where the system includes a fiber-optic switch, the switch is capable of switching or splitting the reference beam into at least a first channel and a second channel. The system may additionally include a first movable or fixed mirror positioned within the first channel, and a second movable or fixed mirror positioned within the second channel. The switch can be capable of switching the reference beam between the first and second channel substantially continuously, and may do so at a rate of about 50 micro seconds or faster. Alternatively, the switch can operate to switch the reference beam manually at predetermined intervals.

In other embodiments where the system includes a linear stage, the stage is disposed along a portion of the reference beam pathway. The linear stage can include a reference reflector, and the stage is then operable to move the reference reflector to change the pathlength of the reference beam.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF EMBODIMENTS

Figure 1:
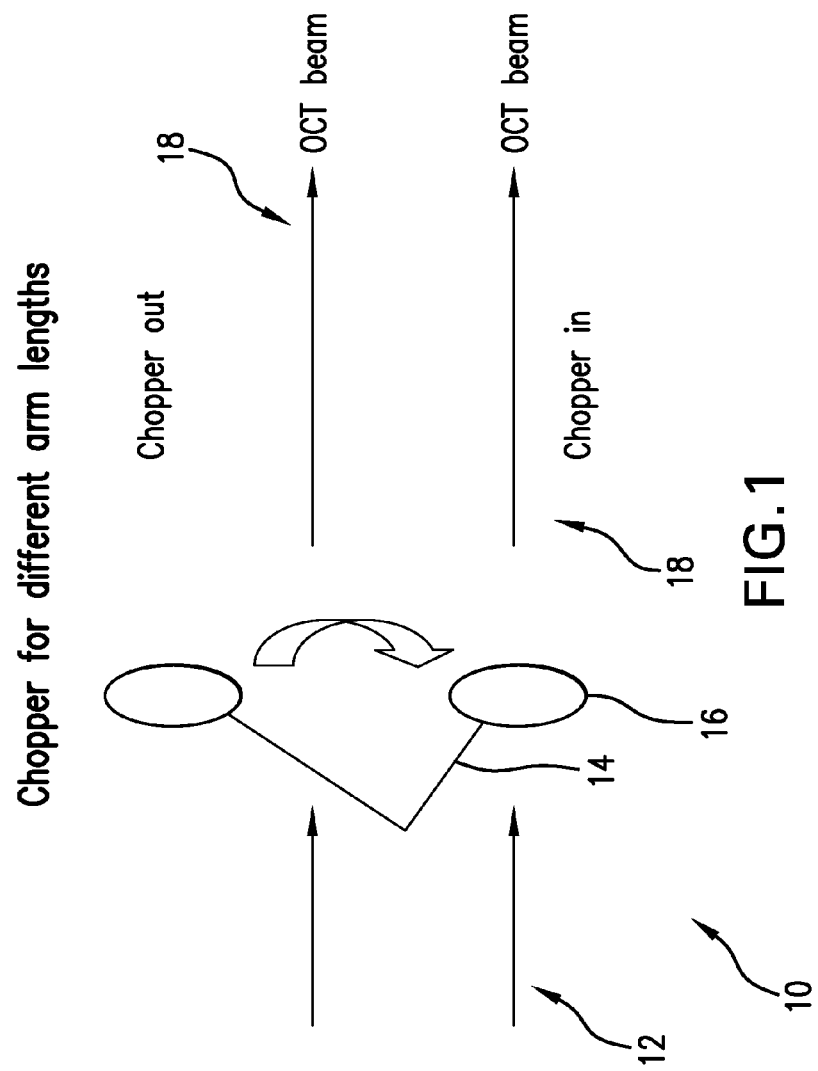
FIG. 1 is a schematic of a system for capturing both the real and virtual images of a contact lens using a FDOCT system constructed in accordance with the principles of the present invention.

Now referring to the drawings in which like reference designators refer to like elements, there is shown in FIG. 1 a system for capturing for the real and imaginary images of an object to be imaged using a FDOCT imaging system referred to generally as "10." The system 10 and the methods discussed herein provide for adjusting the length of the reference beam to capture the real and virtual images of an object, for example, a contact lens, in sequence. In an exemplary embodiment shown in FIG. 1, the reference beam 12 is at least partially refracted when an exposed to an optical chopper 14. The optical chopper 14 may be any device that includes a movable refractive medium 16, for example glass, such as a glass lens, that may be positioned within at least a portion of the beam pathway 18. The chopper 14 may include a wheel or other device that allows for the movement or rotation of the refractive medium 16 into and out of the OCT beam pathway 18. For example, as shown in FIG. 1, the refractive medium 16 is substantially ovular in shape, but may be defined to be any shape or size and may be positioned along any position of the OCT beam pathway 18, whether proximate or distal from the reference reflector.

The refraction of the OCT beam 12 modifies the pathlength of the reference beam such that either a real or virtual image may be captured in sequence. For example, depending on the refractive index, thickness, and/or absorption level of the refractive medium 16, either the real or virtual image may be captured when the refractive medium 16 is positioned within the reference beam pathway 18. When the optical chopper 14 moves the refractive medium 16 outside of the reference beam pathway 18, the real or virtual image may be captured such that the real and virtual images may be captured in sequence to provide for increased signal quality at either the smallest or the largest scan depth. The optical chopper 14 may be manually or automatically moved such that the reference arm length may be modified to capture both real and virtual images. Alternatively, two or more refractive mediums 16, each having a different refractive index, thickness, and/or absorption may be coupled to the optical chopper 14 such that as each refractive medium is rotated within the beam path 18 different aspects, whether real or imaginary, of the image may be captured by varying the pathlength of the reference beam.

It is further contemplated that a processor and database may be programmed to capture and store both the real and virtual images in a database and combine them for optimal signal quality. In particular, a processor may be utilized to rapidly average the real and virtual images in a combined image.

Figure 2:
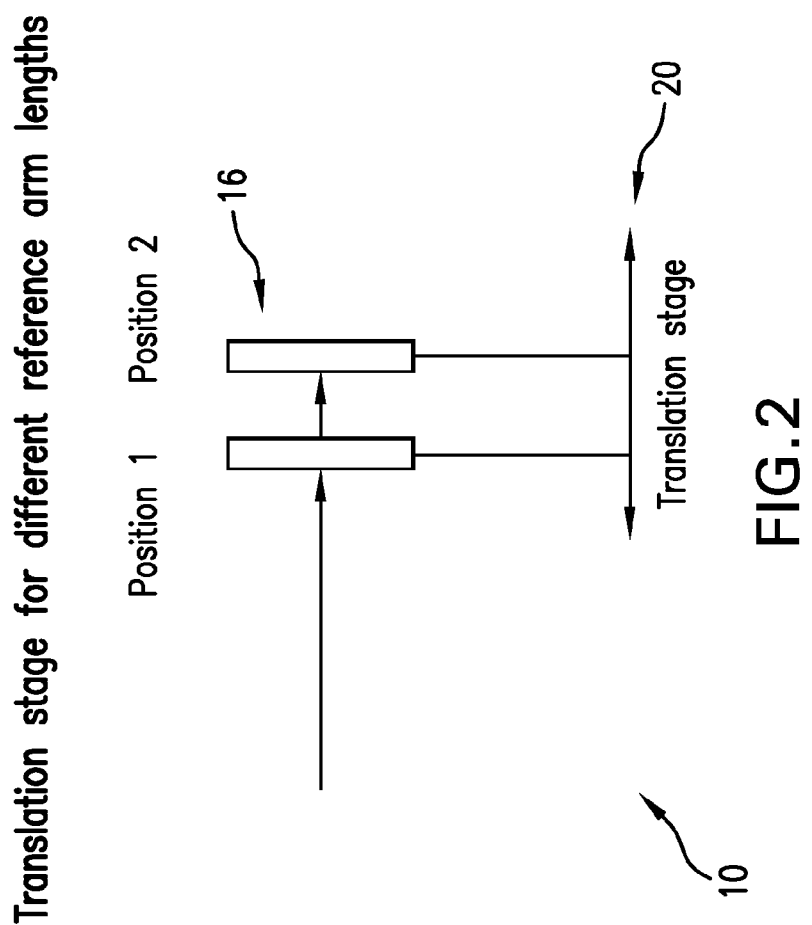
FIG. 2 is another schematic of a system for capturing both the real and virtual images of a contact lens using a FDOCT system constructed in accordance with the principles of the present invention.

Now referring to FIG. 2, in another embodiment, the system 10 may include a stage 20, for example a linear stage, operable to move the reference reflector 16 (refractive medium, for example a mirror), to change the pathlength of the reference beam. In particular, the reflector 16 may alter the distance between two optical fibers within the reference beam 12 such that the real and virtual images may be captured in sequence and processed according to the embodiment in FIG. 1. As the stage 20 moves, the reference arm length changes, resulting in appropriate pathlength change in the reference beam, allowing for the capture of real and virtual images.

Figure 3:
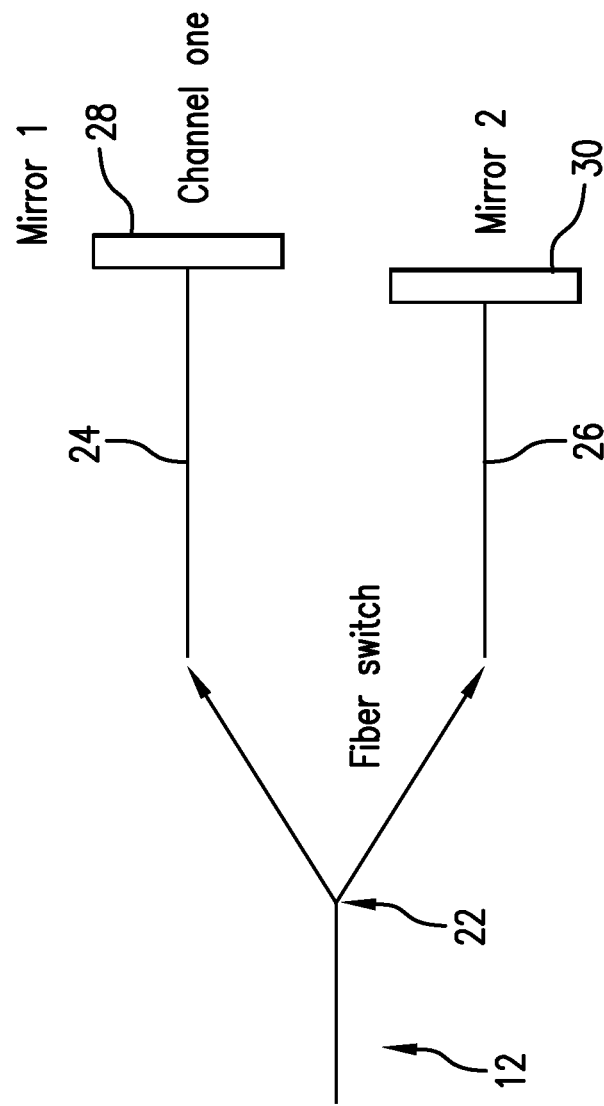
FIG. 3 is yet another schematic of a system for capturing both the real and virtual images of a contact lens using a FDOCT system constructed in accordance with the principles of the present invention.

Now referring to FIG. 3, in another embodiment, a fiber-optic switch 22 capable of splitting the reference beam may be included in the reference beam pathway 18 such that the reference beam pathway 18 may be split into two or more different pathways. For example, OCT beam 12 may be split by fiber-optic switch 22 into at least a first channel 24 and a second channel 26. Within channel 24 or channel 26 the path length to a mirror may be different such that the reference arm length varies from the first channel 24 to the second channel 26 such that the real and virtual images can be captured depending on which channel the beam 12 is directed. In an exemplary embodiment, a first movable or fixed mirror 28 may be positioned within the first channel 24 and a second movable or fixed mirror 30 may be positioned within the second channel 26 to vary the reference arm length. The fiber-optic switch 22 may switch the OCT beam 12 between the first channel 24 and the second channel 26 (i.e., splits the beam back and forth between the first and second channel), either substantially continuously at, for example, a rate of approximately 50 micro seconds or faster, or manually at predetermined intervals, in either case such that the real and virtual images may be captured sequentially.

It is further contemplated that the above system and method for consecutively capturing the real and virtual images of an object, for example contact lens, may be used with a dual-channel FDOCT system or any FDOCT system, and in particular with those having an extended depth range.

The depth range of the real and virtual images can also be calibrated with pre-defined pathlengths of the reference beam, such that the two images are nearly exactly mirror images of each other, and then may be conveniently superimposed or averaged to achieve more uniform signal across the scan depth range.

In any of the above embodiments, the real and virtual images may be captured automatically and combined by a processor for fast and accurate image processing. It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for acquiring real and virtual images of an object, comprising:
   providing a Fourier-domain optical coherence tomography imaging system;
   generating a reference beam having a pathway, and the reference beam having two different pathlengths;
   modifying the pathlength of the reference beam; and
   acquiring the real image and virtual image of the object consecutively;
   and thereafter
   superimposing the acquired real and virtual images to achieve more uniform signal across the scan depth range.

2. The method of claim 1 wherein the step of modifying the pathlength of the reference beam comprises providing an optical chopper disposed along a portion of the reference beam pathway, the optical chopper comprising a movable refractive medium, and moving the movable refractive medium into and out of the optical coherence tomography reference beam pathway.

3. The method of claim 2 wherein the movable refractive medium is a glass lens.

4. The method of claim 1 wherein the step of modifying the pathlength of the reference beam comprises providing a fiber-optic switch disposed along a portion of the reference beam pathway and splitting the reference beam into at least a first channel and a second channel with the fiber-optic switch.

5. The method of claim 4 further comprising a first movable or fixed mirror positioned within the first channel, and a second movable or fixed mirror positioned within the second channel.

6. The method of claim 4 wherein the fiber-optic switch switches the reference beam between the first channel and the second channel substantially continuously.

7. The method of claim 6 wherein the fiber-optic switch switches the reference beam between the first channel and the second channel at a rate of about 50 micro seconds or faster.

8. The method of claim 1 wherein the step of modifying the pathlength of the reference beam comprises providing a linear stage disposed along a portion of the reference beam pathway, the linear stage comprising a reference reflector, and moving the reference reflector to change the pathlength of the reference beam.

\* \* \* \* \*